Mar. 3, 1925.
J. KLABENES
CORN STRIPPER
Filed Jan. 18, 1924
1,528,437
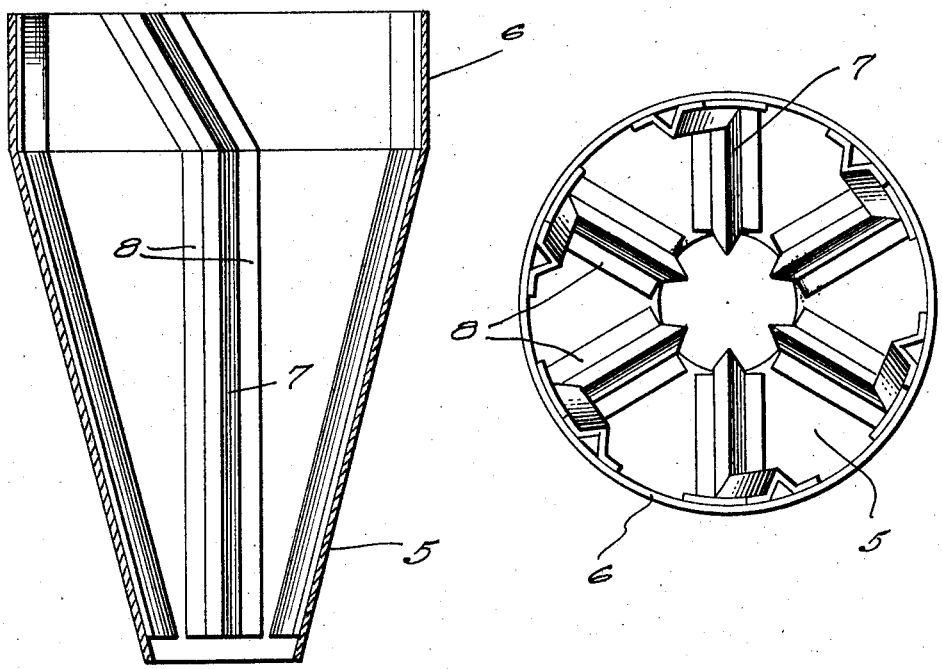

Patented Mar. 3, 1925.

1,528,437

UNITED STATES PATENT OFFICE.

JOHN KLABENES, OF VENANGO, NEBRASKA.

CORN STRIPPER.

Application filed January 18, 1924. Serial No. 687,042.

*To all whom it may concern:*

Be it known that I, JOHN KLABENES, a citizen of the United States, residing at Venango, in the county of Perkins and State of Nebraska, have invented certain new and useful Improvements in Corn Strippers, of which the following is a specification.

This invention relates to an improvement in corn strippers of the implement type and has for its primary object to substantially improve and simplify over articles of this general nature.

An additional object of the invention resides in the provision of a corn stripper whereby shelled corn may be readily stripped from the cobs in a simple and expeditious manner and without requiring any great labor.

A still further object is to provide an article of the above character wherein the same may be manufactured and marketed at extremely small cost and wherein the same may be employed effectively and this with practically no liability of the same becoming out of order.

With the above and other objects in view as the nature of the invention will be better understood, the same comprises the novel form of a corn stripper hereinafter more fully described, shown in the accompanying drawing, and claimed.

In the drawing wherein like reference characters indicate corresponding parts throughout both of the views, Figure 1 is a detail, vertical sectional view of a corn stripper constructed in accordance with the present invention, and Figure 2 is a top plan view thereof.

Now referring in detail to the drawing, a corn stripper constructed in accordance with this invention embodies a substantially conical-shaped casing 5 of heavy sheet metal, the same being open at its opposite end as clearly shown in the drawing. The upper enlarged end of said conical-shaped casing 5 terminates in a relatively wide cylindrical portion 6 for a purpose presently to be set forth.

Within the casing 5 are spaced vertically extending kernel stripping ribs 7 that are relatively V-shaped in end elevation or cross section, the opposite edges of said kernel stripping ribs being flanged as at 8 whereby the same may be welded, soldered, or otherwise secured to the inner surface of said conical-shaped casing 5 as well as to the interior of the cylindrical portion 6 of said casing.

The portions of said ribs that extend within the cylindrical portion 6 of the casing are extended diagonally with respect to the vertical axis of the ribs for obviously directing the kernels of the corn stripped from the cob downwardly into the casing and for thereby preventing the same from slipping outwardly of the casing and dropping upon the floor.

It will also be obvious to those skilled in the art, that through the provision of the cylindrical portion 6 at the upper end of this casing 5, the kernels on the cob at the upper rounded end thereof may be effectively stripped from the cob by scraping said rounded end against the diagonally extending portion of the ribs within said cylindrical portion 6 of the casing.

The specific operation together with numerous advantages of a corn stripper of the present character will be at once appreciated by those familiar with the art to which this invention pertains, and even though I have herein set forth the most practical embodiment of the invention it is nevertheless to be understood that minor changes may be made therein without departing from the spirit and scope of the appended claim.

Having thus described my invention, what I claim as new and desire to secure by Letters Patent is:—

A corn stripper comprising an open ended substantially conical casing terminating at its upper end in a substantially cylindrical mouth, a plurality of circumferentially spaced longitudinally extending kernel stripping ribs secured to the inner wall of the casing and extending from end to end of the latter, the end portions of the ribs within the cylindrical mouth all being directed diagonally with respect to the vertical axis of the casing.

In testimony whereof I affix my signature.

JOHN KLABENES.